Aug. 15, 1950     V. WEINBERG     2,519,208
VIBRATING DEVICE FOR PACKING VARIOUS MATERIALS
Filed Aug. 26, 1948
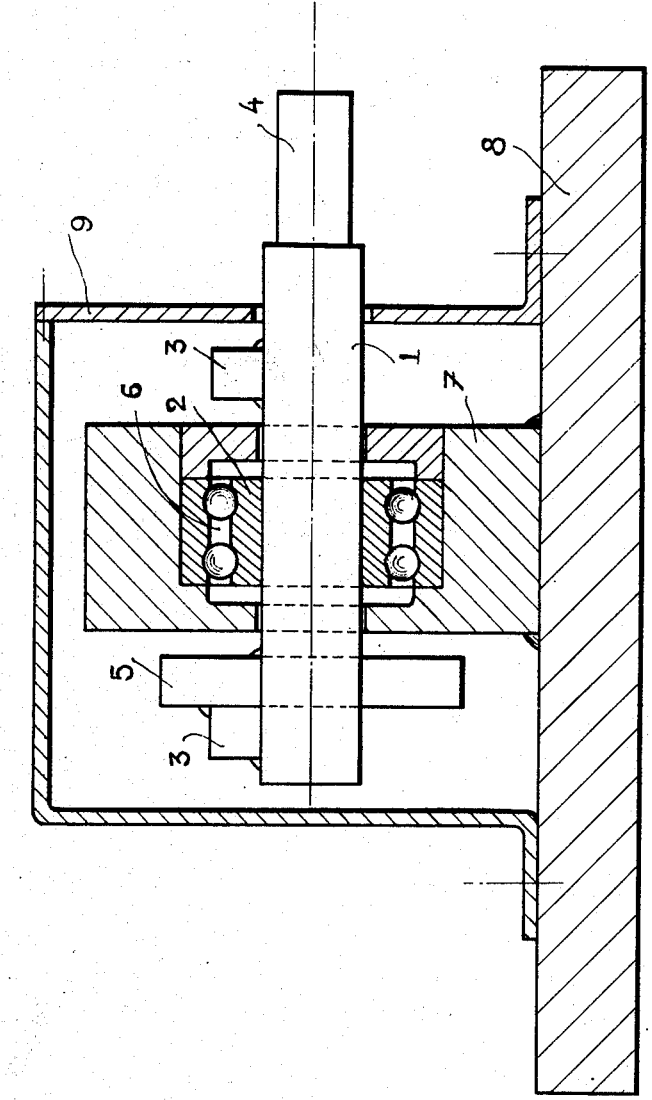
INVENTOR
VICTOR WEINBERG
By *Haseltine, Lake & Co.*
AGENTS

UNITED STATES PATENT OFFICE 2,519,208

VIBRATING DEVICE FOR PACKING VARIOUS MATERIALS

Victor Weinberg, Paris, France

Application August 26, 1948, Serial No. 46,268
In France August 27, 1947

2 Claims. (Cl. 259—72)

It is well known to submit the containers of pasty, pulverulent or fragmentary materials to vibrations of which the purpose is to cause the packing of the said material; such a process is commonly used, for example, in the art of the so-called "vibrated" concrete.

A number of devices adapted to generate the said vibrations have been designed in which the said vibrations result from the quick rotation of a shaft on which are keyed weights suitably offset.

A feature common to these vibrating apparatus consists in that the rotary shaft is supported on two bearings. It will be understood that due to the rotation speed which may be given to such shafts (for example about 15,000 R. P. M.), the alignment of the two bearings must be effected with the highest accuracy if a satisfactory operation of the device is to be ensured.

Now, the applicant has observed that in opposition with what would be accepted by a precision-instruments maker, a vibrating device of which the rotary shaft is mounted in a single bearing is capable of giving the best results.

The object of the invention is to provide such a device of easy and cheap construction and having a compact shape which makes easier its adaptation to the apparatus on which it is intended to be mounted, and requiring no assembling accuracy.

A vibrating device according to the invention is illustrated in the single figure of the accompanying drawings which is a diagrammatical view of the said device in longitudinal section.

The said device comprises essentially a shaft 1 supported at its centre by a bearing 2; on the said shaft are keyed on each side of the bearing 2 offset weights 3. One end 4 on shaft 1 is connected to an engine, such as by means of a flexible shaft (not shown); near to the other end is keyed a flywheel 5 the weight of which is intended to balance the additional weight of the flexible shaft.

Bearing 2 is provided with a ball-bearing 6 or the like (needle roller bearings etc.). Part 7 which constitutes the frame of the said bearing is supported by a metal plate 8 intended to be secured on the parts to be vibrated, such as: moulds full of concrete, miscellaneous containers of pulverulent or fragmentary materials, sieves, etc.

The assembly may be housed within a protective casing 9.

I claim:

1. A vibrating device for pasty, pulverulent or fragmentary materials, comprising a base intended to rest upon the material to be vibrated, a rotatable shaft, a single bearing within which said shaft rotates, said bearing being supported on said base, and offset weights keyed on said shaft on each side of the single bearing.

2. A vibrating device for pasty, pulverulent or fragmentary materials, comprising a base intended to rest upon the material to be vibrated, a rotatable shaft, a single bearing within which said shaft rotates, said bearing being supported on said base, offset weights keyed on said shaft on each side of the single bearing and a fly wheel keyed on said shaft.

VICTOR WEINBERG.

REFERENCES CITED

The following references are of record in the file of this patent:

UNITED STATES PATENTS

| Number | Name | Date |
| --- | --- | --- |
| 1,517,587 | Roth | Dec. 2, 1924 |
| 1,549,555 | Jorgensen | Aug. 11, 1925 |
| 1,752,266 | Sloan | Mar. 25, 1930 |
| 2,054,253 | Horch | Sept. 15, 1936 |
| 2,194,410 | Svenson | Mar. 10, 1940 |